(No Model.)

C. F. JAMES.
REEL FOR CHECK ROW WIRES.

No. 305,597. Patented Sept. 23, 1884.

Witnesses
I. D. Walker
Frank A. Remley.

Inventor
CHARLES F. JAMES
By L. P. Graham atty.

UNITED STATES PATENT OFFICE.

CHARLES F. JAMES, OF ARGENTA, ILLINOIS.

REEL FOR CHECK-ROW WIRES.

SPECIFICATION forming part of Letters Patent No. 305,597, dated September 23, 1884.

Application filed June 30, 1884. (No model.)

*To all whom it may concern:*

Be it known that I, CHARLES F. JAMES, a citizen of the United States, residing near Argenta, in the county of Macon and State of Illinois, have invented certain new and useful Improvements in Reels for Check-Row Wires, of which the following is a specification.

Figure 1:
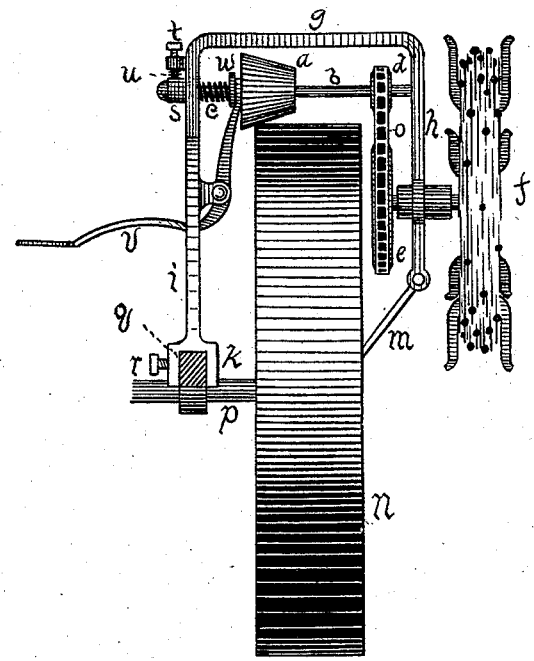
Figure 2:
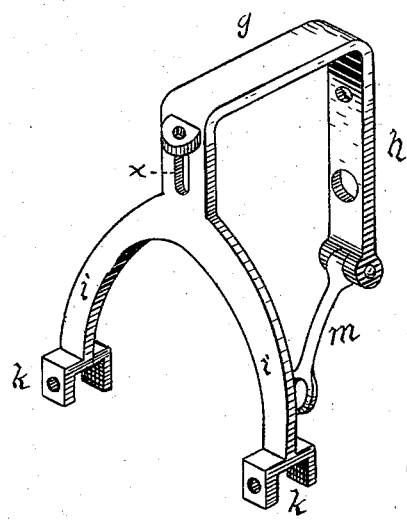

In the drawings accompanying and forming a part of this specification, Figure 1 is a rear view of a planter-wheel, showing the position of my device with relation thereto; and Fig. 2 is a perspective view of the reel-frame.

*a* is a cone-pulley adapted to rest on the edge of the planter-wheel and receive motion therefrom.

*b* is a shaft on which pulley *a* is mounted.

*c* is a spring that fits between pulley *a* and a side of the frame of the reel.

*d* is a sprocket-pulley rigidly attached to shaft *b*.

*e* is a sprocket-wheel on the same shaft with reel *f*.

*g* represents the part of the reel-frame that extends horizontally over the planter-wheel.

*h* represents the part of the frame that extends downward on the outside of the planter-wheel.

*i i* show the parts of the reel-frame that extend upward from the planter-frame.

*k k* represent clamps for securing *i i* to the frame of the planter.

*r* shows a screw for securing clamps *k k*.

*m* is a brace that connects the lower part of frame *h* with the extremity of the axle of the corn-planter.

*n* is the planter-wheel.

*p* is the axle of the corn-planter.

*q* shows a section of the planter-frame.

*o* is a sprocket-belt that connects wheels *d* and *e*.

*f* is the check-row-wire reel.

*s* is a collar that rests on the projecting end of shaft *b*.

*u* is a spring designed to impart pressure to shaft *b* through collar *s*.

*x* in Fig. 2 shows a slot in which the inner end of shaft *a* operates.

*t* is a set-screw adapted to regulate the pressure of spring *u* on shaft *a*.

I prefer to construct the pulley *a* in such a manner that it may have free motion longitudinally on shaft *b*, and when so constructed I provide it with suitable means for adjusting its position on said shaft—see lever *v*, which operates in collar *w* of the pulley and co-operates with spring *c* in effecting said adjustment.

Pulley *a* by its shape always presents a surface to the edge of the planter-wheel, thereby insuring absolute contact in all cases, as no dirt can pack that the edge of the planter-wheel will not penetrate. As shown in the drawings, a spring, *u*, is relied on to hold the pulley *a* in contact with the planter-wheel, and the size of this spring may be varied to suit circumstances, or may be entirely dispensed with and a lever or other substitute be used in its place.

The frame of the reel is attached to the planter substantially as shown; but the shape of the frame and mode of attachment will be modified to conform to the construction of the planter to which it is attached.

The reel *f* is made detachable from its axle in order that its position may be reversed, for the purpose of taking up the wire after the same has been laid, and vice versa.

In operation, power is transmitted to the reel *f* through wheel *n*, pulley *a*, shaft *b*, and sprocket-gear *d o e* in the order named. When the pulley *a* is provided with free motion longitudinally on shaft *b*, it may be adjusted to conform to the increasing or decreasing diameter of the winding or unwinding reel. In other words, as the wire winds up on the reel it increases the diameter of the same, thereby increasing its speed in winding. To conform to this change the rotating speed of the reel is decreased by permitting the large end of the pulley to operate on the planter-wheel.

When the pulley *a* is rigidly attached to its shaft, lever *v* and spring *c* may be discarded, and, if desired, a suitable lever may be connected with the end of shaft *b*, for the purpose of regulating the pressure of the pulley on the planter-wheel.

I am aware that wire-reels have been operated by means of frictional pulleys on the drive or supporting wheels of the machine to which they are connected, as shown in patents to Munson, August 15, 1882, No. 262,608; Haworth, May 8, 1883, No. 277,030; Murphey, October 9, 1883, No. 286,218, and others, and therefore I lay no claim, broadly, to such an arrangement.

I claim as new and desire to secure by Letters Patent—

1. The combination, with a reel for check-row wire and with the wheel of a corn-planter, of a cone-shaped pulley adapted to operate on the edge of the planter-wheel and impart motion to the reel.

2. The combination, with a reel for check-row wire and with the wheel of a corn-planter, of a cone-pulley adapted to operate on the edge of the planter-wheel and move longitudinally on its shaft, as and for the purpose set forth.

3. The combination, in a reel for corn-planters, of pulley $a$, shaft $b$, sprocket-gear $d\ o\ e$, frame $i\ g\ h$, springs $c\ u$, and lever $v$, as and for the purpose set forth.

4. The combination, in a reel for check-row wire, of clamps $k\ k$, vertical supports $i\ i$, provided with slot $x$, horizontal bar $g$, vertical extension $h$, provided with suitable bearings, and brace $m$, adapted to connect with the axle of the corn-planter, as set forth.

CHARLES F. JAMES.

Witnesses:
WM. H. CLIFTON,
ELMEDA C. BARR.